US012675180B2

(12) United States Patent
Fujita et al.

(10) Patent No.: US 12,675,180 B2
(45) Date of Patent: Jul. 7, 2026

(54) TOP PANEL FOR TACTILE SENSE PRESENTATION DEVICE, TACTILE SENSE PRESENTATION DEVICE, AND METHOD FOR MANUFACTURING TOP PANEL FOR TACTILE SENSE PRESENTATION DEVICE

(71) Applicant: NIPPON ELECTRIC GLASS CO., LTD., Otsu (JP)

(72) Inventors: Naoki Fujita, Otsu (JP); Takumi Kinoshita, Otsu (JP); Masaru Iwao, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 18/881,382

(22) PCT Filed: Jun. 29, 2023

(86) PCT No.: PCT/JP2023/024197
§ 371 (c)(1),
(2) Date: Jan. 6, 2025

(87) PCT Pub. No.: WO2024/009887
PCT Pub. Date: Jan. 11, 2024

(65) Prior Publication Data
US 2026/0010247 A1      Jan. 8, 2026

(30) Foreign Application Priority Data
Jul. 8, 2022      (JP) ................................. 2022-110581

(51) Int. Cl.
G06F 3/041          (2006.01)
G06F 3/01           (2006.01)
(52) U.S. Cl.
CPC .............. *G06F 3/041* (2013.01); *G06F 3/016* (2013.01); *G06F 2203/04103* (2013.01)

(58) Field of Classification Search
CPC . G06F 3/041; G06F 3/016; G06F 2203/04103
See application file for complete search history.

(56) References Cited

U.S. PATENT DOCUMENTS

2010/0289762 A1    11/2010  Ito et al.
2015/0185848 A1     7/2015  Levesque et al.
(Continued)

FOREIGN PATENT DOCUMENTS

JP          2009123685 A      6/2009
JP          2015181068 A     10/2015
(Continued)

OTHER PUBLICATIONS

International Search Report in PCT/JP2023/024197, mailed Aug. 15, 2023, 2 pages.
(Continued)

*Primary Examiner* — Afroza Chowdhury
(74) *Attorney, Agent, or Firm* — Keating & Bennett, LLP

(57)          ABSTRACT

Provided is a top panel for a tactile sense presentation device in which the top panel can have a sufficiently wide range of changes in frictional force and thus effectively increase the expressiveness of the tactile sense. A top panel 1 for a tactile sense presentation device is for use in a tactile sense presentation device 10, has an outer principal surface 1a located on an exterior side of the tactile sense presentation device 10, and includes ruggedness provided on at least a portion of the outer principal surface 1a, wherein the ruggedness includes: first ruggedness in which where a cutoff value of a high-pass filter λc1 is five times a spacing between ruggedness in a measured total profile of the outer principal surface 1a and a cutoff value of a low-pass filter λs1 is 26.6 μm, a maximum height of the ruggedness is 0.5 nm to 2000 nm and a spacing between the ruggedness is 50 μm to 2000 μm; and second ruggedness in which where a cutoff value of a high-pass filter λc2 is 14 μm and a cutoff
(Continued)

value of a low-pass filter $\lambda s2$ is 0.35 μm, a three-dimensional arithmetical mean height Sa of the ruggedness is 0.5 nm to 100 nm and a maximum height Sz of the ruggedness is 8 nm or more.

7 Claims, 2 Drawing Sheets

(56)                    References Cited

U.S. PATENT DOCUMENTS

| | | | | |
|---|---|---|---|---|
| 2018/0071881 | A1* | 3/2018 | Horie | B24B 13/01 |
| 2020/0301521 | A1* | 9/2020 | Fujita | G06F 3/041 |
| 2025/0270133 | A1* | 8/2025 | Fujita | G06F 3/041 |

FOREIGN PATENT DOCUMENTS

| | | | |
|---|---|---|---|
| JP | 2018180621 | A | 11/2018 |
| JP | 2020074106 | A | 5/2020 |
| JP | 2022091675 | A | 6/2022 |

OTHER PUBLICATIONS

Written Opinion in PCT/JP2023/024197, mailed Aug. 15, 2023, 4 pages.

* cited by examiner

[FIG. 1.]
10
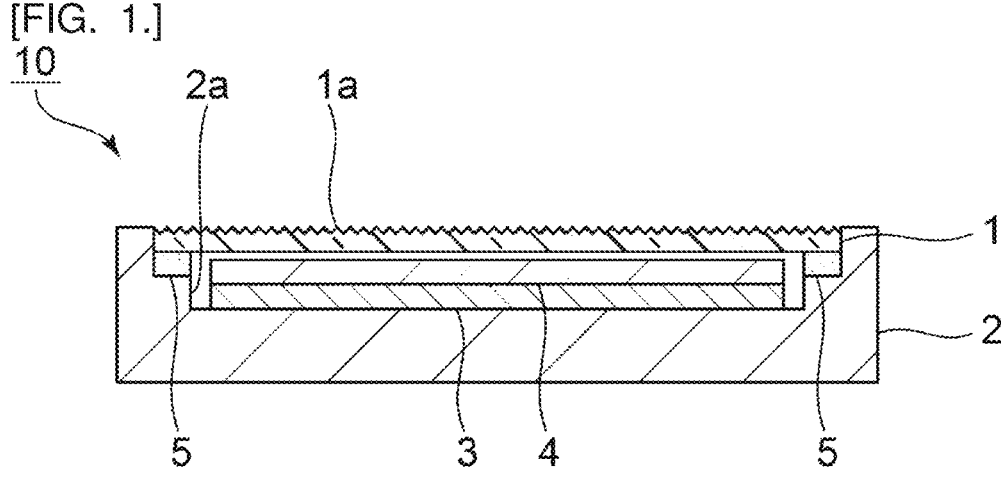
[FIG. 2.]
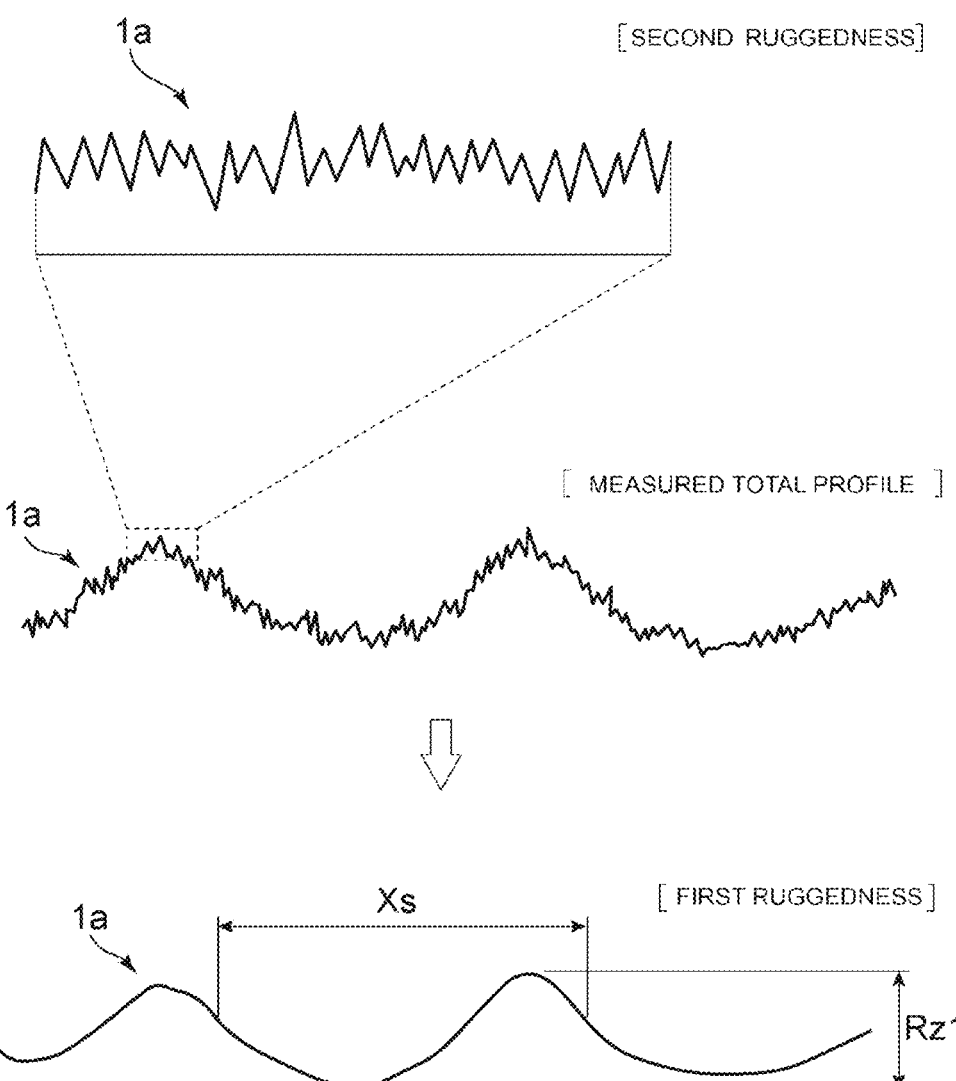

[FIG. 3.]
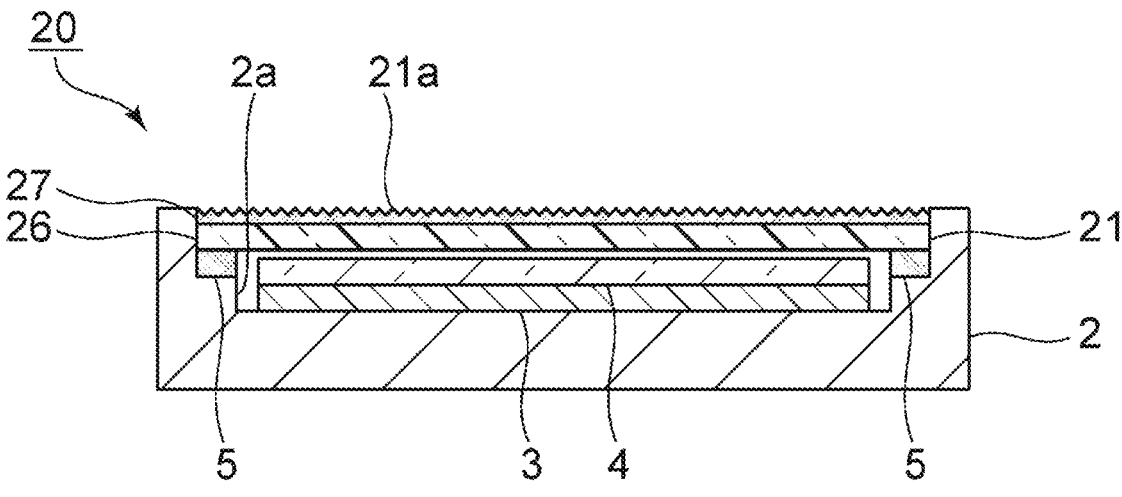
[FIG. 4.]
(a)
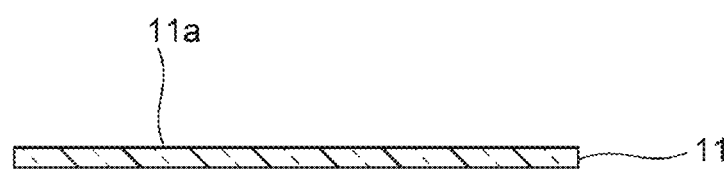
(b)
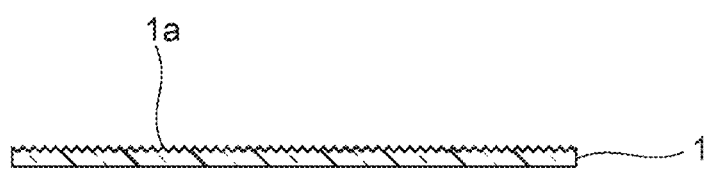

TOP PANEL FOR TACTILE SENSE PRESENTATION DEVICE, TACTILE SENSE PRESENTATION DEVICE, AND METHOD FOR MANUFACTURING TOP PANEL FOR TACTILE SENSE PRESENTATION DEVICE

TECHNICAL FIELD

The present invention relates to top panels for tactile sense presentation devices, tactile sense presentation devices, and methods for manufacturing top panels for tactile sense presentation devices.

BACKGROUND ART

Recently, there has been increasing attention to tactile sense presentation devices that provide information through tactile senses. For example, a tactile sense presentation device has been studied which, when operated through a touch panel by a person, can change the tactile sense of the person having touched the touch panel.

For example, Patent Literature 1 below discloses a tactile sense presentation device that changes a frictional force thereon occurring when touched by a person. This tactile sense presentation device includes a top panel serving as a portion to be touched by a person. The tactile sense presentation device changes the tactile sense by applying ultrasonic waves to the top panel.

Alternatively, Patent Literature 2 below discloses a top panel an outer principal surface of which is located on an exterior side of a tactile sense presentation device and has an arithmetic mean roughness (Ra) of not less than 2 nm and not more than 100 nm. Patent Literature 2 describes that by applying ultrasonic waves to the top panel, the expressiveness of the tactile sense presentation device can be increased.

CITATION LIST

Patent Literature

[PTL 1]
JP-A-2015-181068
[PTL 2]
JP-A-2018-180621

SUMMARY OF INVENTION

Technical Problem

However, the tactile sense presentation device described in Patent Literature 1 has a problem in that the change in frictional force is small and thus gives an insufficient range of expression of the tactile sense. The tactile sense presentation device described in Patent Literature 2 also have a limited range of changes in frictional force and, therefore, has a problem of difficulty in further increasing the expressiveness of the tactile sense.

An object of the present invention is to provide a top panel for a tactile sense presentation device, a tactile sense presentation device, and a method for manufacturing a top panel for a tactile sense presentation device, all of which can have a sufficiently wide range of changes in frictional force and thus effectively increase the expressiveness of the tactile sense.

Solution to Problem

A top panel for a tactile sense presentation device of aspect 1 in the present invention is a top panel for use in a tactile sense presentation device, has an outer principal surface located on an exterior side of the tactile sense presentation device, and includes ruggedness provided on at least a portion of the outer principal surface, wherein the ruggedness include: first ruggedness in which where a cutoff value of a high-pass filter $\lambda c1$ is five times a spacing between ruggedness in a measured total profile of the outer principal surface and a cutoff value of a low-pass filter $\lambda s1$ is 26.6 µm, a maximum height of the ruggedness is 0.5 nm to 2000 nm and a spacing between the ruggedness is 50 µm to 2000 µm; and second ruggedness in which where a cutoff value of a high-pass filter $\lambda c2$ is 14 µm and a cutoff value of a low-pass filter $\lambda s2$ is 0.35 µm, a three-dimensional arithmetical mean height Sa of the ruggedness is 0.5 nm to 100 nm and a maximum height Sz of the ruggedness is 8 nm or more.

A top panel for a tactile sense presentation device of aspect 2 is the top panel for a tactile sense presentation device according to aspect 1, wherein where the cutoff value of the high-pass filter $\lambda c2$ in a measurement area of 74×55 µm is 14 µm and the cutoff value of the low-pass filter $\lambda s2$ in the measurement area is 0.35 µm, a kurtosis Sku may be 3.2 or more and a skewness Ssk may be –0.1 or less.

A top panel for a tactile sense presentation device of aspect 3 in the present invention is a top panel for use in a tactile sense presentation device, has an outer principal surface located on an exterior side of the tactile sense presentation device, and includes ruggedness provided on at least a portion of the outer principal surface, wherein the ruggedness include: first ruggedness in which where a cutoff value of a high-pass filter $\lambda c1$ is 14 µm and a cutoff value of a low-pass filter $\lambda s1$ is 0.35 µm, a maximum height of the ruggedness is 0.5 nm to 2000 nm and a spacing between the ruggedness is 3 µm to less than 50 µm; and second ruggedness in which where a cutoff value of a high-pass filter $\lambda c2$ in a 5 µm square area is 2.5 µm, a three-dimensional arithmetical mean height Sa of the ruggedness is 0.5 nm to 100 nm and a maximum height Sz of the ruggedness is 8 nm or more.

A top panel for a tactile sense presentation device of aspect 4 is the top panel for a tactile sense presentation device according to aspect 3, wherein where the cutoff value of the high-pass filter $\lambda c2$ in a 5 µm square area is 2.5 µm, a kurtosis Sku may be 3.2 or more and a skewness Ssk may be –0.1 or less.

A top panel for a tactile sense presentation device of aspect 5 is the top panel for a tactile sense presentation device according to any one of aspects 1 to 4, wherein the top panel may be made of glass.

A top panel for a tactile sense presentation device of aspect 6 is the top panel for a tactile sense presentation device according to any one of aspects 1 to 5, wherein the top panel may be transparent.

A tactile sense presentation device of aspect 7 in the present invention includes: the top panel for a tactile sense presentation device according to any one of aspects 1 to 6; and an actuator that applies ultrasonic waves to the top panel for a tactile sense presentation device.

A method for manufacturing a top panel for a tactile sense presentation device of aspect 8 in the present invention is a method for manufacturing the top panel for a tactile sense presentation device according to any one of aspects 1 to 6 and includes the steps of: preparing an original panel having a principal surface; and subjecting the principal surface of the original panel to a wet blasting treatment.

Advantageous Effects of Invention

The present invention enables provision of a top panel for a tactile sense presentation device, a tactile sense presentation device, and a method for manufacturing a top panel for a tactile sense presentation device, all of which can have a sufficiently wide range of changes in frictional force and thus effectively increase the expressiveness of the tactile sense.

BRIEF DESCRIPTION OF DRAWINGS

FIG. 1 is a schematic cross-sectional view showing a tactile sense presentation device according to one embodiment of the present invention.

FIG. 2 shows diagrams for illustrating a measured total profile of an outer principal surface of a top panel for a tactile sense presentation device.

FIG. 3 is a schematic cross-sectional view showing a tactile sense presentation device according to a modification of the one embodiment of the present invention.

FIGS. 4(*a*) and 4(*b*) are cross-sectional views for illustrating an example of a method for manufacturing a top panel for a tactile sense presentation device.

DESCRIPTION OF EMBODIMENTS

Hereinafter, a description will be given of preferred embodiments. However, the following embodiments are merely illustrative and the present invention is not limited to the following embodiments. Throughout the drawings, members having substantially the same functions may be referred to by the same reference characters.

[Top Panel for Tactile Sense Presentation Device and Tactile Sense Presentation Device]

First Embodiment

FIG. 1 is a schematic cross-sectional view showing a tactile sense presentation device according to a first embodiment of the present invention. As shown in FIG. 1, a tactile sense presentation device 10 according to this embodiment includes: a housing 2 with an opening 2*a*; a top panel 1 sealing the opening 2*a*; an actuator 5 provided in contact with the top panel 1. The top panel 1 is a top panel for a tactile sense presentation device according to the present invention. The actuator 5 is a piezoelectric element that applies ultrasonic waves to the top panel 1.

The tactile sense presentation device 10 further includes: a display 3 provided in the interior of the housing 2; and a touch sensor 4 provided on top of the display 3. In this embodiment, the top panel 1 is made of transparent glass and the touch sensor 4 is a touch panel that transmits light.

The top panel 1 has an outer principal surface 1*a* located on an exterior side (a user side) of the tactile sense presentation device 10. The tactile sense presentation device 10 is a device where the tactile sense on the outer principal surface 1*a* changes. More specifically, the frictional force of the outer principal surface 1*a* changes. For example, when a person slides the finger on the outer principal surface 1*a* and, at this time, the actuator 5 applies ultrasonic waves to the portion of the outer principal surface 1*a* where the finger is slid, the finger is thrust up by the vibrating outer principal surface 1*a*. Thus, the frictional force between the finger and the outer principal surface 1*a* is reduced.

The tactile sense presentation device 10 includes: a vibration controller (not shown) that controls the location where ultrasonic waves are to be applied to the top panel 1 by the actuator 5 and the amplitude of the ultrasonic waves to be applied; and an image controller (not shown) that controls an image to be displayed on the display 3. The vibration controller is connected to the actuator 5, the touch sensor 4, and the image controller. When a person touches the top panel 1, the touch sensor 4 detects a point on the top panel 1 where the person touches. From the touch sensor 4, location data on the point where the person touches is input to the vibration controller. Furthermore, from the image controller, location data on the location of an image to be displayed on the display 3 and other data are input to the vibration controller. According to the above location data and the image to be displayed on the display 3, the vibration controller controls the frequency and amplitude of ultrasonic waves to be applied to the top panel 1 by the actuator 5.

By using the vibration controller to combine a portion where ultrasonic waves are applied and a portion where ultrasonic waves are not applied or control the frequency of ultrasonic waves, the frictional force of each portion of the outer principal surface 1*a* of the top panel 1 can be adjusted. When portions where ultrasonic waves are applied and portions where ultrasonic waves are not applied are alternately disposed, a feeling of ruggedness can be expressed. Alternatively, also when portions where the amplitude of applied ultrasonic waves is large and portions where the amplitude of applied ultrasonic waves is small are alternately disposed, a feeling of ruggedness can be expressed. Thus, the tactile sense can be changed according to the portion being touched by a person or the image displayed on the display 3.

The inventors have found that when ruggedness including first ruggedness with a large spacing and second ruggedness with a small spacing are formed on at least a portion of the outer principal surface 1*a* of the top panel 1 and the respective surface roughnesses of the first ruggedness and the second ruggedness are in respective particular ranges, the range of changes in frictional force can be substantially widened and, thus, the expressiveness of the tactile sense can be effectively increased.

More specifically, the inventors have found that, in a first aspect of the invention, when at least a portion of the outer principal surface 1*a* of the top panel 1 includes: first ruggedness in which where the cutoff value of a high-pass filter $\lambda c1$ is five times the spacing between ruggedness in a measured total profile of the outer principal surface and the cutoff value of a low-pass filter $\lambda s1$ is 26.6 μm, the maximum height of the ruggedness is 0.5 nm to 2000 nm and the spacing between the ruggedness is 50 μm to 2000 μm; and second ruggedness in which where the cutoff value of a high-pass filter $\lambda c2$ is 14 μm and the cutoff value of a low-pass filter $\lambda s2$ is 0.35 μm, the three-dimensional arithmetical mean height Sa of the ruggedness is 0.5 nm to 100 nm and the maximum height Sz of the ruggedness is 8 nm or more, the range of changes in frictional force can be substantially widened and the expressiveness of the tactile sense can be effectively increased.

The inventors have also found that, in a second aspect of the invention, when at least a portion of the outer principal surface 1*a* of the top panel 1 includes: first ruggedness in which where the cutoff value of a high-pass filter $\lambda c1$ is 14 μm and the cutoff value of a low-pass filter $\lambda s1$ is 0.35 μm, the maximum height of the ruggedness is 0.5 nm to 2000 nm and the spacing between the ruggedness is 3 μm to less than 50 μm; and second ruggedness in which where the cutoff value of a high-pass filter $\lambda c2$ in a 5 μm square area is 2.5 μm, the three-dimensional arithmetical mean height Sa of the ruggedness is 0.5 nm to 100 nm and the maximum height Sz of the ruggedness is 8 nm or more, the range of changes in frictional force can be substantially widened and the expressiveness of the tactile sense can be effectively increased.

Note that the first aspect of the invention is adopted when the average value of spacings between the first ruggedness in the measured total profile is 50 μm or more, while the second aspect of the invention is adopted when the average value of spacings between the first ruggedness in the measured total profile is less than 50 μm. Hereinafter, the first aspect of the invention and the second aspect of the invention may be referred to collectively as the present invention.

It can be considered that by controlling the surface roughnesses of the first ruggedness and the second ruggedness on the outer principal surface 1a of the top panel 1 within the respective particular ranges in the above manner, the area of contact between the finger and the outer principal surface 1a upon application of ultrasonic waves can be effectively reduced and, thus, the change in state of contact between the finger and the outer principal surface 1a can be increased. It can be considered that, therefore, the amount of change in feeling of sliding upon application of ultrasonic waves can be increased and, thus, the expressiveness of the tactile sense can be effectively increased.

The maximum height of the first ruggedness can be measured, for example, using the maximum height roughness Rz1 of roughness profile elements. The spacing between the first ruggedness can be measured, for example, using the mean width RSm1 of roughness profile elements.

The above "maximum height roughness Rz (Rz1)" is a parameter defined in JIS B 0601:2001. Specifically, as shown in FIG. 2, the maximum height roughness Rz1 is a sum of the height of the highest peak and the depth of the deepest valley (a sum of absolute values of them) in the measured total profile of the outer principal surface 1a of the top panel 1.

The above "mean width RSm (RSm1) of roughness profile elements" is a parameter that is defined in JIS B 0601:2001 and represents an average pitch between adjacent bump and dip pairs in a measured total profile of the outer principal surface 1a of the top panel 1. Specifically, the mean width RSm1 is an average of periodic widths Xs of ruggedness in a predetermined sampling length shown in FIG. 2.

In the first aspect of the invention, the maximum height of the first ruggedness and the spacing between the first ruggedness can be obtained, for example, by selecting lines of a measurement length of 5000 μm or more except for singularities (significantly high values or low values) at arbitrary four locations in a measurement area and determining the respective average values of the maximum heights and spacings in the four lines as measured values.

In the second aspect of the invention, the maximum height of the first ruggedness and the spacing between the first ruggedness can be obtained, for example, by selecting lines of a measurement length of 74 μm except for singularities (significantly high values or low values) at arbitrary four locations in a measurement area and determining the respective average values of the maximum heights and spacings in the four lines as measured values.

In the present invention, the above "three-dimensional arithmetical mean height Sa" is a parameter which is defined in ISO 25178 and in which a measured total profile representing a cross-sectional shape of ruggedness is extended to a surface.

In each of the first and second aspects of the invention, the maximum height of the first ruggedness is not less than 0.5 nm, preferably not less than 1 nm, more preferably not less than 5 nm, even more preferably not less than 10 nm, still even more preferably not less than 20 nm, yet even more preferably not less than 30 nm, yet still even more preferably not less than 40 nm, particularly preferably not less than 50 nm, not more than 2000 nm, preferably not more than 1900 nm, more preferably not more than 1800 nm, even more preferably not more than 1500 nm, still even more preferably not more than 1400 nm, yet even more preferably not more than 1300 nm, yet still even more preferably not more than 1250 nm, yet still even more preferably not more than 1200 nm, yet still even more preferably not more than 1100 nm, yet still even more preferably not more than 1000 nm, yet still even more preferably not more than 800 nm, and particularly preferably not more than 500 nm. When the maximum height of the first ruggedness is the above lower limit or more, the changes in frictional force can be more substantially increased and, thus, the expressiveness of the tactile sense can be more effectively increased. When the maximum height of the first ruggedness is the above upper limit or less, the haze can be reduced and, thus, the image viewed through the top panel 1 can be much less likely to be blurred.

In the first aspect of the invention, the spacing between the first ruggedness is preferably not less than 100 μm, more preferably not less than 200 μm, even more preferably not less than 400 μm, still even more preferably not less than 500 μm, yet still even more preferably not less than 700 μm, particularly preferably not less than 1000 μm, preferably not more than 1900 μm, more preferably not more than 1800 μm, even more preferably not more than 1700 μm, still even more preferably not more than 1500 μm, yet still even more preferably not more than 1300 μm, and particularly preferably not more than 1000 μm. In the second aspect of the invention, the spacing between the first ruggedness is preferably not less than 4 μm, more preferably not less than 5 μm, even more preferably not less than 7 μm, preferably not more than 48 μm, more preferably not more than 45 μm, and even more preferably not more than 40 μm. When the spacing between the first ruggedness is the above lower limit or more and the above upper limit or less, the changes in frictional force can be more substantially increased and, thus, the expressiveness of the tactile sense can be more effectively increased.

In each of the first and second aspects of the invention, the three-dimensional arithmetical mean height Sa of the second ruggedness is preferably not less than 1 nm, more preferably not less than 1.5 nm, even more preferably not less than 2 nm, still even more preferably not less than 5 nm, yet still even more preferably not less than 10 nm, preferably not more than 90 nm, more preferably not more than 75 nm, even more preferably not more than 70 nm, still even more preferably not more than 60 nm, yet even more preferably not more than 50 nm, yet still even more preferably not more than 40 nm, and particularly preferably not more than 30 nm. When the three-dimensional arithmetical mean height Sa of the second ruggedness is the above lower limit or more, the changes in frictional force can be more substantially increased and, thus, the expressiveness of the tactile sense can be more effectively increased. When the three-dimensional arithmetical mean height Sa the second ruggedness is the above upper limit or less, the haze can be reduced and, thus, the image viewed through the top panel 1 can be much less likely to be blurred.

In each of the first and second aspects of the invention, the maximum height Sz of the second ruggedness is preferably not less than 10 nm, more preferably not less than 20 nm, even more preferably not less than 30 nm, still even more preferably not less than 50 nm, preferably not more than 1500 nm, more preferably not more than 1300 nm, even more preferably not more than 1000 nm, still even more preferably not more than 900 nm, yet even more preferably not more than 700 nm, yet still even more preferably not more than 500 nm, yet still even more preferably not more than 300 nm, yet still even more preferably not more than 200 nm, yet still even more preferably not more than 170 nm, yet still even more preferably not more than 150 nm, yet still even more preferably not more than 130 nm, yet still even more preferably not more than 110 nm, and particularly preferably not more than 100 nm. When the maximum height Sz of the second ruggedness is the above lower limit or more, the changes in frictional force can be more substantially increased and, thus, the expressiveness of the tactile sense can be more effectively increased. When the maximum height Sz of the second ruggedness is the above upper limit or less, the haze can be reduced and, thus, the image viewed through the top panel 1 can be much less likely to be blurred.

In each of the first and second aspects of the invention, the kurtosis Sku1 of the first ruggedness is preferably not less than 2, more preferably not less than 2.1, even more preferably not less than 2.2, preferably not more than 5.7, more preferably not more than 5.5, and even more preferably not more than 5. When the kurtosis Sku1 of the first ruggedness is the above lower limit or more, the changes in frictional force can be more substantially increased and, thus, the expressiveness of the tactile sense can be more effectively increased. When the kurtosis Sku1 of the first ruggedness is the above upper limit or less, the bumps have obtuse angles and, thus, the durability of the top panel can be further increased.

Furthermore, the skewness Ssk1 of the first ruggedness is preferably not less than −0.7, more preferably not less than −0.5, even more preferably not less than 0, preferably not more than 0.6, more preferably not more than 0.5, and even more preferably not more than 0.4. When the skewness Ssk1 of the first ruggedness is the above lower limit or more and the above upper limit or less, the changes in frictional force can be more substantially increased and, thus, the expressiveness of the tactile sense can be more effectively increased.

The kurtosis Sku1 and skewness Ssk1 of the first ruggedness can be measured in conformity with ISO 25178. Furthermore, the kurtosis Sku1 and skewness Ssk1 of the first ruggedness are measured under conditions of the first aspect or second aspect of the invention.

In each of the first and second aspects of the invention, the kurtosis Sku2 of the second ruggedness is preferably not less than 3.2, more preferably not less than 3.3, even more preferably not less than 3.4, particularly preferably not less than 3.5, preferably not more than 12, more preferably not more than 11, and even more preferably not more than 8. When the kurtosis Sku2 of the second ruggedness is the above lower limit or more, the changes in frictional force can be more substantially increased and, thus, the expressiveness of the tactile sense can be more effectively increased. When the kurtosis Sku2 of the second ruggedness is the above upper limit or less, the haze can be reduced and, thus, the image viewed through the top panel 1 can be much less likely to be blurred.

Furthermore, the skewness Ssk1 of the second ruggedness is preferably not less than −3, more preferably not less than −2.5, even more preferably not less than −2, preferably not more than −0.1, more preferably not more than −0.11, even more preferably not more than −0.12, and particularly preferably not more than −0.15. When the skewness Ssk1 of the second ruggedness is the above lower limit or more and the above upper limit or less, the changes in frictional force can be more substantially increased and, thus, the expressiveness of the tactile sense can be more effectively increased.

The kurtosis Sku2, the skewness Ssk2, and the maximum height Sz of the second ruggedness can be measured in conformity with ISO 25178. Furthermore, the kurtosis Sku2, the skewness Ssk2, and the maximum height Sz of the second ruggedness are also measured under conditions of the first aspect or second aspect of the invention.

In this embodiment, the haze of the top panel 1 is preferably not more than 30%, more preferably not more than 20%, even more preferably not more than 15%, still even more preferably not more than 10%, and particularly preferably not more than 5%. In the case where emphasis is placed on the transparency of the top panel 1, the haze may be not more than 3%.

The thickness of the top panel 1 is preferably 0.1 mm to 2 mm and more preferably 0.3 mm to 1.5 mm. If the thickness of the top panel 1 is too small, the mechanical strength is likely to decrease. On the other hand, if the thickness of the top panel 1 is too large, vibrations from the actuator 5 are less likely to be transmitted to the outer principal surface 1*a* and, thus, the frictional force between the finger and the outer principal surface 1*a* tends to be large.

Although in this embodiment the top panel 1 is transparent, the top panel 1 may not be transparent. For example, the outer principal surface 1*a* of the top panel 1 may be provided with an opaque portion, such as a design (for example, a picture or photograph of a switch, a button, an animal or a musical instrument). The area of the opaque portion of the top panel 1 may be not less than 5%, not less than 30%, not less than 50% or not less than 90% of the entire area of the top panel 1. Furthermore, in such a case, the tactile sense presentation device 10 may not include a display 3. It is sufficient that the touch sensor 4 is provided on the surface of the top panel 1 opposite to the outer principal surface 1*a* or a touch sensor based on an infrared-optical imaging system is provided instead. The term transparent herein means that the visible light transmittance is 70% or more.

Although in this embodiment ruggedness are provided on the entire outer principal surface 1*a* of the top panel 1, it is sufficient for the ruggedness to be provided, as required, on at least a portion of the outer principal surface 1*a* of the top panel 1 and, for example, on a portion thereof to be further increased in expressiveness of the tactile sense (such as a portion effective for a touch gesture or a designed portion). The area of portions with ruggedness in the top panel 1 may be not less than 5%, not less than 30%, not less than 50% or not less than 90% of the entire area of the top panel 1.

Although the top panel 1 of the tactile sense presentation device 10 is a substrate made of glass, the material for the top panel 1 is not limited to this and the top panel 1 may be made of a material other than glass, for example, resin or ceramics.

As shown in FIG. 1, the tactile sense presentation device 10 includes a plurality of actuators 5. More specifically, the tactile sense presentation device 10 includes: an actuator 5 provided in contact with a portion of the top panel 1 near one end thereof; and an actuator 5 provided in contact with a portion of the top panel 1 near the other end. The plurality of actuators 5 are disposed between the top panel 1 and the housing 2. The arrangement of the actuators 5 is not limited to the above arrangement and the actuators 5 only have to be provided to enable application of ultrasonic waves to the top panel 1. It is sufficient that at least one actuator 5 is provided.

FIG. 3 is a schematic cross-sectional view showing a tactile sense presentation device according to a modification of the one embodiment of the present invention. As shown in FIG. 3, a top panel 21 includes: a substrate 26 as a body; and an outer layer film 27 provided on the substrate 26. As for the rest, a tactile sense presentation device 20 according to this modification has the same structure as the tactile sense presentation device 10 shown in FIG. 1.

An outer principal surface 21*a* of the top panel 21 includes the surface of the outer layer film 27 and ruggedness are formed on the surface of the outer layer film 27. The outer layer film 27 is, for example, an inorganic film. The material for the inorganic film is not particularly limited, but, for example, $SiO_2$ may be used.

In the case where the inorganic film is a $SiO_2$ film, a $SiO_2$-coating film can be formed by applying a liquid containing a $SiO_2$ component by spraying and then drying the applied liquid containing a $SiO_2$ component.

Also in this modification, like the embodiment in FIG. 1, the changes in frictional force can be substantially increased and, thus, the expressiveness of the tactile sense can be effectively increased.

[Method for Manufacturing Top Panel for Tactile Sense Presentation Device]

Hereinafter, a method for manufacturing a top panel for a tactile sense presentation device according to the present invention will be described by dividing it into a first method and a second method as specific examples with reference to FIGS. 4(*a*) and 4(*b*).

(First Method)

As shown in FIG. 4(*a*), an original panel 11 having a principal surface 11*a* is prepared. Next, the principal surface 11*a* of the original panel 11 is subjected to wet blasting treatment. In the first method, ruggedness are formed on the principal surface 11*a* of the original panel 11 by concurrently forming first ruggedness and second ruggedness by the wet blasting treatment.

The wet blasting treatment is performed by injecting a slurry obtained by homogeneously stirring abrasive particles composed of alumina particles or other solid particles and a liquid, such as water, onto the original panel 11 at high speed. The injection can be performed using an injection nozzle. The slurry is injected, together with compressed air, at high speed through the injection nozzle. Furthermore, various surface textures can be formed by moving a gun with an injection nozzle relatively to the original panel 11. For example, by moving the gun in a grid pattern at a predetermined scan interval and a constant speed, the first ruggedness and the second ruggedness can be formed. Alternatively, by moving the gun with an injection nozzle unicursally with respect to the original panel 11, a uniform surface texture can be formed over the entire surface.

In the wet blasting treatment, when the slurry injected at high speed impinges on the original panel 11, the abrasive particles in the slurry grind the surface of the original panel 11 and, thus, ruggedness are formed on the principal surface 11*a* of the original panel 11. In this manner, a top panel 1 shown in FIG. 4(*b*) can be obtained. The blown abrasive particles and fragments of the original panel 11 ground by the abrasive particles are flushed away by the injected liquid and, therefore, the amount of particles remaining on the outer principal surface 1*a* of the top panel 1 is small.

In the first method, the particle size of the abrasive particles may be, for example, not less than 0.3 μm and not more than 10 μm. The scan interval of the gun may be, for example, not less than 100 μm and not more than 2000 μm. The number of scans of the gun may be, for example, not less than one and not more than ten. The slurry injection pressure may be, for example, not less than 0.1 MPa and not more than 0.4 MPa. The concentration of the slurry may be, for example, not less than 1 wt % and not more than 10 wt %. Furthermore, the gun travel speed may be, for example, not less than 0.1 mm/s and not more than 50 mm/s.

In the first method, the maximum height of the first ruggedness can be increased by, in the wet blasting treatment, increasing the particle size of the abrasive particles, changing the shape of the abrasive particles to a polygonal shape, increasing the number of scans of the gun, increasing the scan interval of the gun, increasing the slurry injection pressure, increasing the concentration of the slurry, decreasing the gun travel speed or shortening the injection distance. Furthermore, the spacing between the first ruggedness can be increased by, in the wet blasting treatment, increasing the particle size of the abrasive particles, changing the shape of the abrasive particles to a polygonal shape, increasing the number of scans of the gun, increasing the slurry injection pressure, increasing the concentration of the slurry or decreasing the gun travel speed.

Moreover, the three-dimensional arithmetical mean height Sa and maximum height Sz of the second ruggedness can be increased by, in the wet blasting treatment, increasing the particle size of the abrasive particles, increasing the slurry injection pressure, decreasing the gun travel speed or increasing the number of scans of the gun.

When in wet blasting treatment the slurry is injected onto the original panel 11, the liquid carries abrasive particles to the original panel 11. Therefore, fine abrasive particles can be used compared to dry blasting treatment. In addition, the impact upon impingement of the abrasive particles onto the original panel 11 is small and, therefore, precise processing can be achieved. With the use of dry blasting treatment, it is difficult to form ruggedness with appropriate sizes even using small abrasive particles. As seen from the above, by subjecting the original panel 11 to wet blasting treatment, ruggedness with appropriate sizes can be easily formed on the original panel 11 and the increase in haze can be prevented.

(Second Method)

As shown in FIG. 4(*a*), an original panel 11 having a principal surface 11*a* is prepared. Next, the principal surface 11*a* of the original panel 11 is subjected to a first wet blasting treatment. In the second method, preparatory ruggedness are formed on the principal surface 11*a* of the original panel 11 by the first wet blasting treatment.

In the first wet blasting treatment, the particle size of the abrasive particles may be, for example, not less than 0.3 μm and not more than 10 μm. The scan interval of the gun may be, for example, not less than 500 μm and not more than 2000 μm. The number of scans of the gun may be, for example, not less than one and not more than ten. The slurry injection pressure may be, for example, not less than 0.1 MPa and not more than 0.4 MPa. Furthermore, the gun travel speed may be, for example, not less than 0.1 mm/s and not more than 100 mm/s.

Next, the original panel 11 with preparatory ruggedness formed on the principal surface 11*a* is subjected to etching treatment. Thereby, first ruggedness can be formed on the principal surface 11*a* of the original panel 11. The etching treatment can be performed, for example, by immersing the original panel 11 into a solution containing hydrofluoric acid or a solution containing hydrofluoric acid and another acid. Examples of the other acid that can be used include sulfuric acid, nitric acid, and hydrochloric acid. Additionally, a chelating agent, such as citric acid, may be used.

The content of hydrofluoric acid in the etching liquid may be, for example, not less than 0.1% by mass and not more than 50.0% by mass. The content of sulfuric acid in the etching liquid may be, for example, not less than 0% by mass and not more than 60.0% by mass. Furthermore, the content of water in the etching liquid may be, for example, not less than 20.0% by mass and not more than 99.9% by mass.

The liquid temperature of the etching liquid may be, for example, not lower than 10° C. and not higher than 50° C. Furthermore, the time of immersion into the etching liquid may be, for example, not less than 10 seconds and not more than 60 minutes.

The etching treatment may be performed using hydrogen fluoride (HF) gas.

Next, the principal surface 11a of the original panel 11 with first ruggedness formed on the principal surface 11a is subjected to a second wet blasting treatment. By the second wet blasting treatment, second ruggedness are further formed on the principal surface 11a of the original panel 11. In this manner, a top panel 1 shown in FIG. 4(b) can be obtained.

In the second wet blasting treatment, the particle size of the abrasive particles may be, for example, not less than 0.3 μm and not more than 10 μm. The scan interval of the gun may be, for example, not less than 100 μm and not more than 2000 μm. The number of scans of the gun may be, for example, not less than one and not more than ten. The slurry injection pressure may be, for example, not less than 0.1 MPa and not more than 0.4 MPa. Furthermore, the gun travel speed may be, for example, not less than 0.1 mm/s and not more than 100 mm/s.

In the second method, the maximum height of the first ruggedness and the spacing between the first ruggedness can be increased by, in the first wet blasting treatment, increasing the particle size of the abrasive particles, increasing the slurry injection pressure, decreasing the gun travel speed or increasing the number of scans of the gun.

Furthermore, the maximum height of the first ruggedness can be reduced by increasing the concentration of sulfuric acid in the etching treatment. On the other hand, the maximum height of the first ruggedness and the spacing between the first ruggedness can be increased by increasing the time of immersion into the etching liquid.

Moreover, the three-dimensional arithmetical mean height Sa and maximum height Sz of the second ruggedness can be increased by, in the second wet blasting treatment, increasing the particle size of the abrasive particles, increasing the slurry injection pressure, decreasing the gun travel speed or increasing the number of scans of the gun.

In obtaining a top panel 21 having an outer layer film 27 as shown in FIG. 3, a coating agent containing, for example, a silica precursor is applied to a principal surface of the original panel by spray coating. Thus, a coating is formed on the principal surface. Next, the coating is heated. The heating temperature is preferably in a range of 80° C. to 250° C. and more preferably in a range of 100° C. to 230° C. Thus, an outer layer film 27 is formed.

Furthermore, an antireflection film for reducing the reflectance may be formed on at least one of the outer and inner surfaces of the top panel 1 or an antipollution film for preventing adhesion of fingerprints and giving water repellency and oil repellency may be formed on the outer principal surface 1a of the top panel 1.

Examples that can be used as the antireflection film include: a low-refractive index film having a lower refractive index than the top panel 1; and a dielectric multi-layer film in which low-refractive index films having a relatively low refractive index and high-refractive index films having a relatively high refractive index are alternately layered. The antireflection film can be formed by sputtering, CVD or other methods.

In the case where the outer principal surface 1a of the top panel 1 is provided with an antireflection film, the ruggedness on the outer principal surface 1a of the top panel 1 are formed so that the ruggedness on the surface of the antireflection film include the above-described first ruggedness and second ruggedness.

The antipollution film preferably contains a fluorine-containing polymer containing silicon in its main chain. Examples of the fluorine-containing polymer that can be used include polymers the main chains of which contain a —Si—O—Si— unit and the side chains of which contain a water-repellent functional group containing fluorine. The fluorine-containing polymer can be synthesized, for example, using dehydrocondensation of silanol.

In the case where the outer principal surface 1a of the top panel 1 is provided with an antireflection film and an antipollution film, an antireflection film is formed on the outer principal surface 1a of the top panel 1 and an antipollution film is formed on the antireflection film.

In the case where the outer principal surface 1a of the top panel 1 is provided with an antipollution film, the ruggedness on the outer principal surface 1a of the top panel 1 are formed so that the ruggedness on the surface of the antipollution film include the above-described first ruggedness and second ruggedness.

Hereinafter, a description will be given in further detail of the present invention with reference to specific examples. The present invention is not at all limited by the following examples and modifications and variations may be appropriately made therein without changing the gist of the invention.

Example 1 (Ex. 1)

A principal surface of a 1.1 mm thick original panel made of aluminosilicate glass was entirely subjected to wet blasting treatment to concurrently form first ruggedness and second ruggedness, thus making a top panel. The wet blasting treatment was performed by using a slurry prepared by homogeneously stirring 3 wt % of abrasive particles formed of alumina having a particle size of #8000 and 97 wt % of water, and injecting the slurry to the original panel at an injection pressure of 0.25 MPa while moving a gun in a grid pattern at a scan interval of 500 μm and a constant speed with respect to a treatment table on which the original panel was placed. The travel speed of the gun was set to satisfy a condition that the maximum height of the first ruggedness on the outer principal surface of the top panel reached 1.7 nm (i.e., a gun travel speed of 20 mm/s).

Example 2 (Ex. 2)

A top panel was made in the same manner as in Example 1 except that the travel speed of the gun was set to satisfy a condition that the maximum height of the first ruggedness on the outer principal surface of the top panel reached 21.6 nm (i.e., a gun travel speed of 1 mm/s).

Example 3 (Ex. 3)

A top panel was made in the same manner as in Example 1 except that the travel speed of the gun was set to satisfy a condition that the maximum height of the first ruggedness on the outer principal surface of the top panel reached 45.1 nm (i.e., a gun travel speed of 0.5 mm/s).

Example 4 (Ex. 4)

A top panel was made in the same manner as in Example 1 except that a slurry containing 6 wt % of abrasive particles formed of alumina with a particle size of #4000 and 94 wt % of water was used, the injection pressure of the slurry was set at 0.32 MPa, and the travel speed of the gun was set to satisfy a condition that the maximum height of the first ruggedness on the outer principal surface of the top panel reached 20 nm (i.e., a gun travel speed of 30 mm/s).

Example 5 (Ex. 5)

A top panel was made in the same manner as in Example 1 except that a slurry containing 6 wt % of abrasive particles formed of alumina with a particle size of #4000 and 94 wt % of water was used, the injection pressure of the slurry was set at 0.32 MPa, and the travel speed of the gun was set to satisfy a condition that the maximum height of the first ruggedness on the outer principal surface of the top panel reached 40 nm (i.e., a gun travel speed of 15 mm/s).

Example 6 (Ex. 6)

A top panel was made in the same manner as in Example 1 except that the scan interval of the gun was set at 750 μm and the travel speed of the gun was set to satisfy a condition that the maximum height of the first ruggedness on the outer principal surface of the top panel reached 0.9 nm (i.e., a gun travel speed of 20 mm/s).

Example 7 (Ex. 7)

A top panel was made in the same manner as in Example 6 except that the travel speed of the gun was set to satisfy a condition that the maximum height of the first ruggedness on the outer principal surface of the top panel reached 6.9 nm (i.e., a gun travel speed of 5 mm/s).

Example 8 (Ex. 8)

A top panel was made in the same manner as in Example 6 except that the travel speed of the gun was set to satisfy a condition that the maximum height of the first ruggedness on the outer principal surface of the top panel reached 35.3 nm (i.e., a gun travel speed of 1 mm/s).

Example 9 (Ex. 9)

A top panel was made in the same manner as in Example 1 except that the scan interval of the gun was set at 1000 μm and the travel speed of the gun was set to satisfy a condition that the maximum height of the first ruggedness on the outer principal surface of the top panel reached 9.1 nm (i.e., a gun travel speed of 10 mm/s).

Example 10 (Ex. 10)

A top panel was made in the same manner as in Example 9 except that the travel speed of the gun was set to satisfy a condition that the maximum height of the first ruggedness on the outer principal surface of the top panel reached 49.0 nm (i.e., a gun travel speed of 2 mm/s).

Example 11 (Ex. 11)

A top panel was made in the same manner as in Example 1 except that the scan interval of the gun was set at 1200 μm and the travel speed of the gun was set to satisfy a condition that the maximum height of the first ruggedness on the outer principal surface of the top panel reached 101.0 nm (i.e., a gun travel speed of 1 mm/s).

Example 12 (Ex. 12)

A top panel was made in the same manner as in Example 1 except that the scan interval of the gun was set at 1500 μm and the travel speed of the gun was set to satisfy a condition that the maximum height of the first ruggedness on the outer principal surface of the top panel reached 149.0 nm (i.e., a gun travel speed of 1 mm/s).

Example 13 (Ex. 13)

A principal surface of a 1.1 mm thick original panel made of aluminosilicate glass was entirely subjected to a first wet blasting treatment, thus forming preparatory ruggedness on the principal surface. The first wet blasting treatment was performed by using a slurry prepared by homogeneously stirring 3 wt % of abrasive particles formed of alumina having a particle size of #4000 and 97 wt % of water, and injecting the slurry to the original panel at an injection pressure of 0.15 MPa while moving a gun at a constant speed of 10 mm/s with respect to a treatment table on which the original panel was placed.

Next, the original panel with the preparatory ruggedness formed on the principal surface was subjected to etching treatment by immersing the original panel into an etching liquid consisting of 2 wt % of hydrofluoric acid and 40 wt % of sulfuric acid and allowing it to stand in the etching liquid at a liquid temperature of 25° C. for 20 minutes, thus forming first ruggedness from the preparatory ruggedness.

Next, the principal surface of the original panel with the first ruggedness formed thereon was entirely subjected to a second wet blasting treatment to form second ruggedness, thus making a top panel. The second wet blasting treatment was performed by using a slurry prepared by homogeneously stirring 3 wt % of abrasive particles formed of alumina having a particle size of #4000 and 97 wt % of water, and injecting the slurry to the original panel at an injection pressure of 0.10 MPa while moving a gun at a constant speed with respect to a treatment table on which the original panel was placed. The travel speed of the gun was set to satisfy a condition that the maximum height of the second ruggedness on the outer principal surface of the top panel reached 7.1 nm (i.e., a gun travel speed of 10 mm/s).

Example 14 (Ex. 14)

A principal surface of a 1.1 mm thick original panel made of aluminosilicate glass was entirely subjected to a first wet blasting treatment, thus forming preparatory ruggedness on the principal surface. The first wet blasting treatment was performed by using a slurry prepared by homogeneously stirring 3 wt % of abrasive particles formed of alumina having a particle size of #8000 and 97 wt % of water, and injecting the slurry to the original panel at an injection pressure of 0.15 MPa while moving a gun at a constant speed of 10 mm/s with respect to a treatment table on which the original panel was placed.

Next, the original panel with the preparatory ruggedness formed on the principal surface was subjected to etching treatment by immersing the original panel into an etching liquid consisting of a mixed acid of 2 wt % of hydrofluoric acid and 40 wt % of sulfuric acid and allowing it to stand in the etching liquid at a liquid temperature of 25° C. for 20 minutes, thus forming first ruggedness from the preparatory ruggedness.

Next, the principal surface of the original panel with the first ruggedness formed thereon was entirely subjected to a second wet blasting treatment to form second ruggedness, thus making a top panel. The second wet blasting treatment was performed by using a slurry prepared by homogeneously stirring 3 wt % of abrasive particles formed of alumina having a particle size of #4000 and 97 wt % of water, and injecting the slurry to the original panel at an injection pressure of 0.12 MPa while moving a gun at a constant speed with respect to a treatment table on which the original panel was placed. The travel speed of the gun was set to satisfy a condition that the maximum height of the second ruggedness on the outer principal surface of the top panel reached 8.9 nm (i.e., a gun travel speed of 10 mm/s).

Example 15 (Ex. 15)

A principal surface of a 1.1 mm thick original panel made of aluminosilicate glass was entirely subjected to a first wet blasting treatment, thus forming preparatory ruggedness on the principal surface. The first wet blasting treatment was performed by using a slurry prepared by homogeneously stirring 3 wt % of abrasive particles formed of alumina having a particle size of #4000 and 97 wt % of water, and injecting the slurry to the original panel at an injection pressure of 0.15 MPa while moving a gun at a constant speed of 10 mm/s with respect to a treatment table on which the original panel was placed.

Next, the original panel with the preparatory ruggedness formed on the principal surface was subjected to etching treatment by immersing the original panel into an etching liquid consisting of a mixed acid of 2% by mass of hydrofluoric acid and 40% by mass of sulfuric acid and allowing it to stand in the etching liquid at a liquid temperature of 25° C. for 30 minutes, thus forming first ruggedness from the preparatory ruggedness.

Next, the principal surface of the original panel with the first ruggedness formed thereon was entirely subjected to a second wet blasting treatment to form second ruggedness, thus making a top panel. The second wet blasting treatment was performed by using a slurry prepared by homogeneously stirring 3 wt % of abrasive particles formed of alumina having a particle size of #4000 and 97 wt % of water, and injecting the slurry to the original panel at an injection pressure of 0.15 MPa while moving a gun at a constant speed with respect to a treatment table on which the original panel was placed. The travel speed of the gun was set to satisfy a condition that the maximum height of the second ruggedness on the outer principal surface of the top panel reached 12.7 nm (i.e., a gun travel speed of 10 mm/s).

Example 16 (Ex. 16)

A principal surface of a 1.1 mm thick original panel made of aluminosilicate glass was entirely subjected to a first wet blasting treatment, thus forming preparatory ruggedness on the principal surface. The first wet blasting treatment was performed by using a slurry prepared by homogeneously stirring 3 wt % of abrasive particles formed of alumina having a particle size of #2000 and 97 wt % of water, and injecting the slurry to the original panel at an injection pressure of 0.25 MPa while moving a gun at a constant speed of 5 mm/s with respect to a treatment table on which the original panel was placed.

Next, the original panel with the preparatory ruggedness formed on the principal surface was subjected to etching treatment by immersing the original panel into an etching liquid consisting of a mixed acid of 2 wt % of hydrofluoric acid and 45 wt % of sulfuric acid and allowing it to stand in the etching liquid at a liquid temperature of 25° C. for 30 minutes, thus forming first ruggedness from the preparatory ruggedness.

Next, the principal surface of the original panel with the first ruggedness formed thereon was entirely subjected to a second wet blasting treatment to form second ruggedness, thus making a top panel. The second wet blasting treatment was performed by using a slurry prepared by homogeneously stirring 3 wt % of abrasive particles formed of alumina having a particle size of #4000 and 97 wt % of water, and injecting the slurry to the original panel at an injection pressure of 0.20 MPa while moving a gun at a constant speed with respect to a treatment table on which the original panel was placed. The travel speed of the gun was set to satisfy a condition that the maximum height of the second ruggedness on the outer principal surface of the top panel reached 16.1 nm (i.e., a gun travel speed of 10 mm/s).

Comparative Example 1 (CEx. 1)

An original panel of the same type as in Example 1 was prepared and used as a top panel as it was. As just described, an untreated top panel was used in Comparative Example 1.

Comparative Example 2 (CEx. 2)

A silica precursor consisting of tetraethyl orthosilicate was prepared as a matrix precursor and a mixture consisting of a nitric acid aqueous solution, ethanol, isopropanol, and methyl ethyl ketone was prepared as a liquid medium. The matrix precursor and the liquid medium were stirred to a homogeneous mixture, thus obtaining a coating agent.

Next, the coating agent was applied at a predetermined amount of ejection and a predetermined nozzle travel speed by spray coating onto a principal surface of a 1.1 mm thick original panel made of aluminosilicate glass, thus forming a coating film. Next, the coating film was heated at 150° C. for 30 minutes. Thus, only first ruggedness formed of an outer layer film made of $SiO_2$ were formed on the original panel, thereby making a top panel.

Comparative Example 3 (CEx. 3)

A principal surface of a 1.1 mm thick original panel made of aluminosilicate glass was entirely subjected to wet blasting treatment, thus forming preparatory ruggedness on the principal surface. The wet blasting treatment was performed by using a slurry prepared by homogeneously stirring 3 wt % of abrasive particles formed of alumina having a particle size of #4000 and 97 wt % of water, and injecting the slurry to the original panel at an injection pressure of 0.15 MPa while moving a gun at a constant speed with respect to a treatment table on which the original panel was placed.

Next, the original panel with the preparatory ruggedness formed on the principal surface was subjected to etching treatment by immersing the original panel into an etching liquid consisting of a mixed acid of 2% by mass of hydro-fluoric acid and 40% by mass of sulfuric acid and allowing it to stand in the etching liquid at a liquid temperature of 25° C. for 20 minutes, thus forming first ruggedness only from the preparatory ruggedness and as a result making a top panel.

Comparative Example 4 (CEx. 4)

A principal surface of a 1.1 mm thick original panel made of aluminosilicate glass was entirely subjected to wet blast-ing treatment, thus forming preparatory ruggedness on the principal surface. The wet blasting treatment was performed by using a slurry prepared by homogeneously stirring 3 wt % of abrasive particles formed of alumina having a particle size of #4000 and 97 wt % of water, and injecting the slurry to the original panel at an injection pressure of 0.15 MPa while moving a gun at a constant speed with respect to a treatment table on which the original panel was placed.

Next, the original panel with the preparatory ruggedness formed on the principal surface was subjected to etching treatment by immersing the original panel into an etching liquid consisting of a mixed acid of 2% by mass of hydro-fluoric acid and 50% by mass of sulfuric acid and allowing it to stand in the etching liquid at a liquid temperature of 25° C. for 20 minutes, thus forming first ruggedness only from the preparatory ruggedness and as a result making a top panel.

Comparative Example 5 (CEx. 5)

A principal surface of a 1.1 mm thick original panel made of aluminosilicate glass was entirely subjected to wet blast-ing treatment to form second ruggedness only, thus making a top panel. The wet blasting treatment was performed by using a slurry prepared by homogeneously stirring 3 wt % of abrasive particles formed of alumina having a particle size of #4000 and 97 wt % of water, and injecting the slurry to the original panel at an injection pressure of 0.10 MPa while moving a gun at a constant speed with respect to a treatment table on which the original panel was placed. The travel speed of the gun was set to satisfy a condition that the maximum height of the second ruggedness on the outer principal surface of the top panel reached 6.9 nm (i.e., a gun travel speed of 10 mm/s).

Comparative Example 6 (CEx. 6)

A principal surface of a 1.1 mm thick original panel made of aluminosilicate glass was entirely subjected to wet blast-ing treatment to form second ruggedness only, thus making a top panel. The wet blasting treatment was performed by using a slurry prepared by homogeneously stirring 3 wt % of abrasive particles formed of alumina having a particle size of #4000 and 97 wt % of water, and injecting the slurry to the original panel at an injection pressure of 0.20 MPa while moving a gun at a constant speed with respect to a treatment table on which the original panel was placed. The travel speed of the gun was set to satisfy a condition that the maximum height of the second ruggedness on the outer principal surface of the top panel reached 15.4 nm (i.e., a gun travel speed of 10 mm/s).

<Evaluations>
[Measurement of Surface Roughness]

The top panels made in Examples 1 to 16 and Compara-tive Examples 1 to 6 were measured in terms of the surface roughness of their outer principal surfaces.

The measurement of the surface roughness was made on the outer principal surface having the first ruggedness and second ruggedness as for Examples 1 to 16, one of the outer principal surfaces as for Comparative Example 1, the $SiO_2$-coated outer principal surface as for Comparative Example 2, the outer principal surface having the first ruggedness only as for Comparative Examples 3 and 4, and the outer principal surface having the second ruggedness only as for Comparative Examples 5 and 6.

(First Ruggedness)

The surface roughness of the first ruggedness was mea-sured in terms of parameters: the spacing between rugged-ness, the maximum height of ruggedness, kurtosis Sku1, and skewness Ssk1. The mean width RSm1 of roughness profile elements was measured as the spacing between ruggedness. The maximum height roughness Rz1 was measured as the maximum height. These parameters were measured with a white-light interference microscope (a white-light interfer-ence microscope NewView 7300 manufactured by Zygo Corporation) in accordance with the following measurement conditions 1 and measurement conditions 2.

Measurement Conditions 1 for First Ruggedness;

Measurement was made, as measurement conditions 1 for first ruggedness, using a 2.5-power objective lens and a 0.5-power zoom lens, with 640×480 camera pixels in a measurement area of 5658 μm×4244 μm until the number of integrations reached one.

Furthermore, in a state where the cutoff value of a high-pass filter λc1 in the first ruggedness was set at a value of five times the spacing between ruggedness in a measured total profile and the cutoff value of a low-pass filter λs1 in the first ruggedness was set at 26.6 μm, the mean width RSm1, the maximum height roughness Rz1, the kurtosis Sku1, and the skewness Ssk1 of roughness profile elements in the first ruggedness were measured.

Each of the parameters for the roughness profile elements in the first ruggedness was obtained by selecting lines of a measurement length of 5658 μm except for singularities (significantly high values or low values) at arbitrary four locations in the measurement area and determining the average value in the four lines as a measured value. In a profile where the first ruggedness are regularly distributed, each of the parameters for the roughness profile elements was measured from lines connecting bumps in the distrib-uted ruggedness.

Measurement Conditions 2 for First Ruggedness;

Measurement was made, as measurement conditions 2 for first ruggedness, using a 50-power objective lens and a 2-power zoom lens, with 640×480 camera pixels in a measurement area of 74 μm×55 μm until the number of integrations reached ten.

Furthermore, in a state where the cutoff value of a high-pass filter λc1 in the first ruggedness was set at 14 μm and the cutoff value of a low-pass filter λs1 in the first ruggedness was set at 0.35 μm, the mean width RSm1, the maximum height roughness Rz1, the kurtosis Sku1, and the skewness Ssk1 of roughness profile elements in the first ruggedness were measured.

Each of the parameters for the roughness profile elements in the first ruggedness was obtained by selecting lines of a measurement length of 74 μm except for singularities (sig-nificantly high values or low values) at arbitrary four locations in the measurement area and determining the average value in the four lines as a measured value.

As for the first ruggedness, measurement conditions 1 were used when the average value of spacings between ruggedness in the measured total profile was 50 μm or more, and measurement conditions 2 were used when the average value of spacings between ruggedness in the measured total profile was less than 50 μm.

(Second Ruggedness)

The surface roughness of the second ruggedness was measured in terms of parameters: arithmetical mean height Sa, maximum height Sz, kurtosis Sku2, and skewness Ssk2. These parameters were measured, under the following measurement conditions 1, with the same white-light interference microscope as used for the first ruggedness, and measured, under the following measurement conditions 2, with an atom force microscope (AFM). Using as the atom force microscope an atom force microscope "Dimension Icon (SPM unit) and Nano Scope V (controller unit)" manufactured by Bruker Corporation, the measurement was conducted based on ISO 25178.

Measurement Conditions 1 for Second Ruggedness;

Measurement was made, as measurement conditions 1 for second ruggedness, using a 50-power objective lens and a 2-power zoom lens, with 640×480 camera pixels in a measurement area of 74 μm×55 μm until the number of integrations reached ten.

Furthermore, in a state where the cutoff value of a high-pass filter λc2 in the second ruggedness was set at 14 μm and the cutoff value of a low-pass filter λs2 in the second ruggedness was set at 0.35 μm, the arithmetical mean height Sa, the maximum height Sz, the kurtosis Sku2, and the skewness Ssk2 of the second ruggedness were measured. Each of the measured values was obtained as the average of measurement results from arbitrary four measurement locations.

Measurement Conditions 2 for second Ruggedness;

Measurement was made, as measurement conditions 2 for second ruggedness, using the tapping mode, at a scan rate of 1 Hz with 512×512 acquired data sets in a measurement area of 5 μm×5 μm. Based on the acquired data sets, the arithmetical mean height Sa, the maximum height Sz, the kurtosis Sku2, and the skewness Ssk2 of the second ruggedness were measured in the 5 μm square area. Analysis was performed in a state where the cutoff value of a high-pass filter λc2 was set at 2.5 μm. Each of the measured values was obtained from a measurement result from an arbitrary measurement location.

In the cases where measurement was made using measurement conditions 1 for the first ruggedness, measurement was made using measurement conditions 1 also for the second ruggedness. On the other hand, in the cases where measurement was made using measurement conditions 2 for the first ruggedness, measurement was made using measurement conditions 2 also for the second ruggedness.

(Sensory Evaluation of Sliding)

The top panels made in Examples 1 to 16 and Comparative Examples 1 to 6 were measured in terms of the surface roughness of their outer principal surfaces.

A 2 cm×5 cm glass specimen simulating each of the top panels was attached onto a top panel with an actuator element attached thereto, thereby preparing a top panel for evaluation. Next, sensory evaluation of sliding (sliding before application of ultrasonic waves) was performed by sliding a finger on the outer principal surface of the glass specimen. The respective glass specimens used in the evaluation were the stop panels made in Examples 1 to 16 and Comparative Examples 1 to 6.

Next, ultrasonic waves were applied to the top panel by the actuator. Thus, ultrasonic waves were applied through the top panel to the glass specimen to vibrate the top panel at its natural frequency in an ultrasonic band. In this state, sensory evaluation of sliding (sliding after application of ultrasonic waves) was performed by sliding the index finger of the dominant hand on the outer principal surface.

The sensory evaluation of sliding was determined based on the following four-level evaluation criteria.

<Evaluation Criteria>

Excellent sliding: OO

Relatively good sliding: O

Somewhat poor sliding: Δ

Poor sliding: X

Next, the difference in level of sliding felt between with and without application of ultrasonic waves to each sample was evaluated with respect to Comparative Example 1 being an untreated top panel. Evaluation of whether the difference in sliding was widened between with and without application of ultrasonic waves was determined based on seven criteria consisting of "Strongly agree: 7", "Agree: 6", "Somewhat agree: 5", "Neither agree nor disagree: 4", "Somewhat disagree: 3", "Disagree: 2", and "Strongly disagree: 1". A value higher than 4 means that the difference in sliding was felt to be widened compared to Comparative Example 1 being an untreated top panel, whereas a value not higher than 4 means that the difference in sliding was felt not to be widened compared to Comparative Example 1 being an untreated top panel.

The results are shown in Tables 1 and 2 below.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Surface | First | Spacing between ruggedness [μm] | 500 | 500 | 500 | 500 | 500 | 750 | 750 |
| Roughness | ruggedness | Maximum height of ruggedness [nm] | 1.7 | 21.6 | 45.1 | 20.0 | 40.0 | 0.9 | 6.9 |
| Parameters | | Sku1 | 4.4 | 2.4 | 2.3 | 5.9 | 7.9 | 2.8 | 2.3 |
| | | Ssk1 | 0.2 | 0.0 | 0.0 | 0.1 | 0.2 | 0.1 | 0.0 |
| | Second | Sa [nm] | 2.33 | 6.23 | 6.81 | 36.60 | 57.70 | 1.99 | 4.02 |
| | ruggedness | Sz [nm] | 67.4 | 139.7 | 112.4 | 821.0 | 1201.3 | 108.8 | 133.3 |
| | | Sku2 | 5.81 | 4.30 | 3.74 | 7.80 | 8.28 | 6.20 | 5.69 |
| | | Ssk2 | −0.546 | −0.277 | −0.234 | −1.149 | −1.160 | −0.743 | −0.502 |
| Sliding before application of ultrasonic waves | | | O | O | O | O | O | O | O |
| Sliding during application of ultrasonic waves | | | OO | OO | OO | OO | OO | OO | OO |
| Difference in sliding between with and without application of ultrasonic waves | | | 7 | 7 | 7 | 7 | 7 | 7 | 7 |

TABLE 1-continued

|  |  |  | Ex. 8 | Ex. 9 | Ex. 10 | Ex. 11 | Ex. 12 |
|---|---|---|---|---|---|---|---|
| Surface Roughness Parameters | First ruggedness | Spacing between ruggedness [μm] | 750 | 1000 | 1000 | 1200 | 1500 |
|  |  | Maximum height of ruggedness [nm] | 35.3 | 9.1 | 49.0 | 101.0 | 149.0 |
|  |  | Sku1 | 2.3 | 2.3 | 2.3 | 2.3 | 2.2 |
|  |  | Ssk1 | 0.1 | 0.1 | 0.1 | 0.1 | −0.1 |
|  | Second ruggedness | Sa [nm] | 6.17 | 2.43 | 4.24 | 2.30 | 4.70 |
|  |  | Sz [nm] | 143.4 | 80.5 | 95.1 | 101.4 | 112.7 |
|  |  | Sku2 | 4.03 | 6.28 | 3.64 | 3.37 | 3.57 |
|  |  | Ssk2 | −0.125 | −0.460 | −0.295 | −0.201 | −0.226 |
| Sliding before application of ultrasonic waves |  |  | ○ | ○ | ○ | ○ | ○ |
| Sliding during application of ultrasonic waves |  |  | ○○ | ○○ | ○○ | ○○ | ○○ |
| Difference in sliding between with and without application of ultrasonic waves |  |  | 7 | 7 | 7 | 7 | 7 |

TABLE 2

|  |  |  | Ex. 13 | Ex. 14 | Ex. 15 | Ex. 16 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| Surface Roughness Parameters | First ruggedness | Spacing between ruggedness [μm] | 8.4 | 4.6 | 7.0 | 17.7 | 0.9 | 6.5 | 9.1 | 8.3 | 2.2 | 2.6 |
|  |  | Maximum height of ruggedness [nm] | 643.1 | 371.9 | 82.1 | 86.1 | 4.0 | 823.0 | 286.3 | 149.4 | 104.8 | 136.1 |
|  |  | Sku1 | 2.4 | 3.6 | 3.0 | 2.6 | 3.4 | 3.4 | 2.9 | 2.8 | 5.8 | 7.2 |
|  |  | Ssk1 | 0.1 | −0.7 | −0.4 | 0.5 | 0.1 | 0.7 | −0.4 | −0.3 | −0.4 | −0.5 |
|  | Second ruggedness | Sa [nm] | 7.13 | 8.91 | 12.70 | 16.10 | 0.15 | 0.57 | 0.53 | 0.53 | 6.85 | 15.40 |
|  |  | Sz [nm] | 122.0 | 111.0 | 165.0 | 155.0 | 1.4 | 7.1 | 6.4 | 7.2 | 135.0 | 149.0 |
|  |  | Sku2 | 10.50 | 5.69 | 9.28 | 3.41 | 2.94 | 3.02 | 3.17 | 3.06 | 8.27 | 4.85 |
|  |  | Ssk2 | −1.810 | −1.200 | −1.790 | −0.537 | 0.040 | −0.040 | −0.079 | −0.030 | −1.490 | −0.854 |
| Sliding before application of ultrasonic waves |  |  | ○ | ○ | ○ | ○ | X | X | X | X | △ | △ |
| Sliding during application of ultrasonic waves |  |  | ○○ | ○○ | ○○ | ○○ | ○ | ○ | ○ | ○ | ○ | ○ |
| Difference in sliding between with and without application of ultrasonic waves |  |  | 6 | 5 | 5 | 6 | — | 3 | 3 | 3 | 4 | 4 |

(Measurement Results of Surface Roughness)

As shown in Tables 1 and 2, as for the top panels in Examples 1 to 16, the spacing between the first ruggedness was in a range of 4.6 μm to 1500 μm and the maximum height of the first ruggedness was in a range of 0.9 nm to 643.1 nm.

Unlike the above, as for the untreated top panel in Comparative Example 1, the spacing between the first ruggedness was 0.9 μm, the maximum height of the first ruggedness was 4.0 nm, and these values were much smaller than in Examples 1 to 16.

As for the top panel in Comparative Example 2 including first ruggedness formed of an outer layer film made of SiO$_2$, the spacing between the first ruggedness was 6.5 μm and the maximum height of the first ruggedness was 823.0 nm.

As for the top panels in Comparative Examples 3 and 4 where only the first ruggedness were provided, the spacing between the first ruggedness was in a range of 8.3 μm to 9.1 μm and the maximum height of the first ruggedness was in a range of 149.4 nm to 286.3 nm.

As for the top panels in Comparative Examples 5 and 6 where only the second ruggedness were provided, the spacing between the first ruggedness was in a range of 2.2 μm to 2.6 μm and the maximum height of the first ruggedness was in a range of 104.8 nm to 136.1 nm.

Furthermore, as shown in Tables 1 and 2, as for the top panels in Examples 1 to 16, the three-dimensional arithmetical mean height Sa of the second ruggedness was in a range of 1.99 nm to 57.7 nm.

Unlike the above, the arithmetical mean height Sa in the untreated top panel in Comparative Example 1 was 0.15 nm, the arithmetical mean height Sa in the top panel in Comparative Example 2 including first ruggedness formed of an outer layer film made of SiO$_2$ was 0.57 nm, the arithmetical mean height Sa in the top panels in Comparative Examples 3 and 4 where only the first ruggedness were provided was 0.53 nm, and the arithmetical mean height Sa in the top panels in Comparative Examples 5 and 6 where only the second ruggedness were provided was in a range of 6.85 nm to 15.40 nm.

Furthermore, as for Examples 1 to 16, the maximum height Sz of the second ruggedness was in a range of 67.4 nm to 1201.3 nm.

Unlike the above, the maximum height Sz in the untreated top panel in Comparative Example 1 was 1.4 nm, the maximum height Sz in the top panel in Comparative Example 2 including first ruggedness formed of an outer layer film made of SiO$_2$ was 7.1 nm, the maximum height Sz in the top panels in Comparative Examples 3 and 4 where only the first ruggedness were provided was in a range of 6.4 nm to 7.2 nm, and the maximum height Sz in the top panels in Comparative Examples 5 and 6 where only the second ruggedness were provided was in a range of 135.0 nm to 149.0 nm.

Furthermore, as for Examples 1 to 16, the kurtosis Sku2 of the second ruggedness was in a range of 3.37 to 10.50.

Unlike the above, the kurtosis Sku2 in the untreated top panel in Comparative Example 1 was 2.94, the kurtosis Sku2 in the top panel in Comparative Example 2 including first ruggedness formed of an outer layer film made of SiO$_2$ was 3.02, the kurtosis Sku2 in the top panels in Comparative Examples 3 and 4 where only the first ruggedness were provided was in a range of 3.06 to 3.17, and the kurtosis Sku2 in the top panels in Comparative Examples 5 and 6 where only the second ruggedness were provided was in a range of 4.85 to 8.27.

Furthermore, as for Examples 1 to 16, the skewness Ssk2 of the second ruggedness was in a range of –1.810 to –0.125.

Unlike the above, the skewness Ssk2 in the untreated top panel in Comparative Example 1 was 0.040, the skewness Ssk2 in the top panel in Comparative Example 2 including first ruggedness formed of an outer layer film made of $SiO_2$ was –0.040, the skewness Ssk2 in the top panels in Comparative Examples 3 and 4 where only the first ruggedness were provided was in a range of –0.079 to –0.030, and the skewness Ssk2 in the top panels in Comparative Examples 5 and 6 where only the second ruggedness were provided was in a range of –1.490 to –0.854.

(Measurement Results of Sliding)

As for the top panels in Examples 1 to 16, appropriate first ruggedness and second ruggedness formed on the outer principal surface of the tactile sense presentation device provided a large change in state of contact between the finger and the outer principal surface (an effective reduction in area of contact between them) and, thus, the amount of change in feeling of sliding upon application of ultrasonic waves could be increased, leading to good evaluation results.

On the other hand, as for the untreated top panel in Comparative Example 1, its smooth outer principal surface monotonously contacted the finger and, therefore, the amount of change in feeling of sliding upon application of ultrasonic waves was limited.

As for the top panel in Comparative Example 2 including first ruggedness formed of an outer layer film made of $SiO_2$, the ruggedness formed on the outer principal surface contactable with the finger were large and, therefore, the effect of reducing the area of contact with the finger was low, which did not provide an effective reduction in sliding even upon application of ultrasonic waves.

As for the top panels in Comparative Examples 3 and 4 where only the first ruggedness were provided, the ruggedness formed on the outer principal surface contactable with the finger were large and, therefore, the effect of reducing the area of contact with the finger was low, which did not provide an effective reduction in sliding even upon application of ultrasonic waves.

As for the top panels in Comparative Examples 5 and 6 where only the second ruggedness were provided, the ruggedness formed on the outer principal surface contactable with the finger were small and, therefore, the effect of reducing the area of contact with the finger was insufficient, resulting in a limited amount of reduction of sliding even upon application of ultrasonic waves.

The top panel for a tactile sense presentation device according to the present invention can be used in various types of tactile sense presentation devices. The top panel can be used as, for example, an operating panel for a handheld terminal, such as a mobile phone, a smartphone, a PDA, a tablet PC or a gaming console, an operating panel for an educational digital device, a TV set, a PC or a digital signage, an operating panel for amusement, an in-vehicle operating panel, an operating panel for a home electrical appliance, such as a microwave, a TV set, a refrigerator, a washing machine, a lighting device or a digital camera, or an operating panel for an industrial machine, such as an ATM (automated teller machine) or an automatic ticket machine.

REFERENCE SIGNS LIST

1 . . . top panel
1a . . . outer principal surface
2 . . . housing
2a . . . opening
3 . . . display
4 . . . touch sensor
5 . . . actuator
10 . . . tactile sense presentation device
11 . . . original panel
11a . . . principal surface
20 . . . tactile sense presentation device
21 . . . top panel
21a . . . outer principal surface
26 . . . substrate
27 . . . outer layer film

The invention claimed is:

1. A top panel for a tactile sense presentation device, the top panel being for use in a tactile sense presentation device, the top panel having an outer principal surface located on an exterior side of the tactile sense presentation device and including ruggedness provided on at least a portion of the outer principal surface, the ruggedness including:

first ruggedness in which where a cutoff value of a high-pass filter $\lambda c1$ is five times a spacing between ruggedness in a measured total profile of the outer principal surface and a cutoff value of a low-pass filter $\lambda s1$ is 26.6 μm, a maximum height of the ruggedness is 0.5 nm to 2000 nm and a spacing between the ruggedness is 50 μm to 2000 μm; and second ruggedness in which where a cutoff value of a high-pass filter $\lambda c2$ is 14 μm and a cutoff value of a low-pass filter $\lambda s2$ is 0.35 μm, a three-dimensional arithmetical mean height Sa of the ruggedness is 0.5 nm to 100 nm and a maximum height Sz of the ruggedness is 8 nm or more; wherein where the cutoff value of the high-pass filter $\lambda c2$ in a measurement area of 74×55 μm is 14 μm and the cutoff value of the low-pass filter $\lambda s2$ in the measurement area is 0.35 μm, a kurtosis Sku is 3.2 or more and a skewness Ssk is –0.1 or less.

2. The top panel for a tactile sense presentation device according to claim 1, wherein the top panel is made of glass.

3. The top panel for a tactile sense presentation device according to claim 1, wherein the top panel is transparent.

4. A method for manufacturing the top panel for a tactile sense presentation device according to claim 1, the method comprising the steps of:

preparing an original panel having a principal surface; and subjecting the principal surface of the original panel to a wet blasting treatment.

5. A top panel for a tactile sense presentation device, the top panel being for use in a tactile sense presentation device, the top panel having an outer principal surface located on an exterior side of the tactile sense presentation device and including ruggedness provided on at least a portion of the outer principal surface, the ruggedness including:

first ruggedness in which where a cutoff value of a high-pass filter $\lambda c1$ is 14 μm and a cutoff value of a low-pass filter $\lambda s1$ is 0.35 μm, a maximum height of the ruggedness is 0.5 nm to 2000 nm and a spacing between the ruggedness is 3 μm to less than 50 μm; and second ruggedness in which where a cutoff value of a high-pass filter $\lambda c2$ in a 5 μm square area is 2.5 μm, a three-dimensional arithmetical mean height Sa of the ruggedness is 0.5 nm to 100 nm and a maximum height Sz of the ruggedness is 8 nm or more; wherein
where the cutoff value of the high-pass filter $\lambda c2$ in a 5 μm square area is 2.5 μm, a kurtosis Sku is 3.2 or more and a skewness Ssk is −0.1 or less.

6. A tactile sense presentation device comprising:
a top panel having an outer principal surface located on an exterior side of the tactile sense presentation device and including ruggedness provided on at least a portion of the outer principal surface,
the ruggedness including:
first ruggedness in which where a cutoff value of a high-pass filter $\lambda c1$ is five times a spacing between ruggedness in a measured total profile of the outer principal surface and a cutoff value of a low-pass filter $\lambda s1$ is 26.6 μm, a maximum height of the ruggedness is 0.5 nm to 2000 nm and a spacing between the ruggedness is 50 μm to 2000 μm; and
second ruggedness in which where a cutoff value of a high-pass filter $\lambda c2$ is 14 μm and a cutoff value of a low-pass filter $\lambda s2$ is 0.35 μm, a three-dimensional arithmetical mean height Sa of the ruggedness is 0.5 nm to 100 nm and a maximum height Sz of the ruggedness is 8 nm or more; and
an actuator that applies ultrasonic waves to the top panel.

7. A tactile sense presentation device comprising:
a top panel having an outer principal surface located on an exterior side of the tactile sense presentation device and including ruggedness provided on at least a portion of the outer principal surface,
the ruggedness including:
first ruggedness in which where a cutoff value of a high-pass filter $\lambda c1$ is 14 μm and a cutoff value of a low-pass filter $\lambda s1$ is 0.35 μm, a maximum height of the ruggedness is 0.5 nm to 2000 nm and a spacing between the ruggedness is 3 μm to less than 50 μm; and
second ruggedness in which where a cutoff value of a high-pass filter $\lambda c2$ in a 5 μm square area is 2.5 μm, a three-dimensional arithmetical mean height Sa of the ruggedness is 0.5 nm to 100 nm and a maximum height Sz of the ruggedness is 8 nm or more; and
an actuator that applies ultrasonic waves to the top panel.

* * * * *